(12) United States Patent  
Vanduyn et al.

(10) Patent No.: US 9,357,262 B2  
(45) Date of Patent: May 31, 2016

(54) SYSTEMS AND METHODS FOR GRAPHICAL CONTROL OF PICTURE-IN-PICTURE WINDOWS

(75) Inventors: Luke Vanduyn, Highlands Ranch, CO (US); Karen Michelle Taxier, Highlands Ranch, CO (US); Matthew Coburn, Denver, CO (US); James Matthew White, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 1543 days.

(21) Appl. No.: 12/241,571

(22) Filed: Sep. 30, 2008

(65) Prior Publication Data

US 2010/0079671 A1 Apr. 1, 2010

(51) Int. Cl.
| | |
|---|---|
| H04N 5/45 | (2011.01) |
| H04N 21/431 | (2011.01) |
| H04N 21/443 | (2011.01) |
| G06F 3/0481 | (2013.01) |
| G06F 3/0486 | (2013.01) |
| H04N 5/44 | (2011.01) |

(52) U.S. Cl.  
CPC ............ *H04N 21/443* (2013.01); *G06F 3/0481* (2013.01); *G06F 3/0486* (2013.01); *H04N 5/45* (2013.01); *H04N 21/4316* (2013.01); *H04N 2005/4432* (2013.01)

(58) Field of Classification Search  
USPC .................. 348/561, 564, 565, 580, 581, 734  
See application file for complete search history.

(56) References Cited

U.S. PATENT DOCUMENTS

| | | | |
|---|---|---|---|
| 4,450,477 A | 5/1984 | Lovett | |
| 4,725,888 A * | 2/1988 | Hakamada | .................... 348/565 |
| 4,739,510 A | 4/1988 | Jeffers et al. | |
| 4,852,019 A | 7/1989 | Vinberg et al. | |
| 4,868,785 A | 9/1989 | Jordan et al. | |
| 5,187,776 A * | 2/1993 | Yanker | ......................... 715/800 |
| 5,260,778 A | 11/1993 | Kauffman et al. | |
| 5,428,734 A | 6/1995 | Haynes et al. | |
| 5,438,372 A * | 8/1995 | Tsumori et al. | ............... 348/565 |
| 5,450,536 A | 9/1995 | Rusenberg et al. | |

(Continued)

FOREIGN PATENT DOCUMENTS

| | | |
|---|---|---|
| EP | 1063797 A2 | 12/2000 |
| EP | 1158793 A2 | 11/2001 |

(Continued)

OTHER PUBLICATIONS

The International Bureau of WIPO "International Preliminary Report on Patentability" mailed Apr. 14, 2011; International Appln. No. PCT/US2009/058236, filed Sep. 24, 2009.

(Continued)

*Primary Examiner* — Brian Yenke  
(74) *Attorney, Agent, or Firm* — Ingrassia Fisher & Lorenz, P.C.

(57) ABSTRACT

Systems and methods are provided for presenting a picture-in-picture (PIP) window on a television or other display generated by a set-top box (STB) or other video receiver. The picture-in-picture window is presented in conjunction with a navigation feature on the display. A two-dimensional input associated with the navigation feature is received from a remote control having a touchpad or other two-dimensional input device. The picture-in-picture window on the display is appropriately adjusted in response to the two-dimensional input.

20 Claims, 4 Drawing Sheets

(56) References Cited

U.S. PATENT DOCUMENTS

| | | | |
|---|---|---|---|
| 5,453,796 A * | 9/1995 | Duffield et al. | 348/565 |
| 5,539,478 A | 7/1996 | Bertram et al. | |
| 5,539,479 A | 7/1996 | Bertram | |
| 5,545,857 A | 8/1996 | Lee et al. | |
| 5,548,340 A | 8/1996 | Bertram | |
| 5,559,961 A | 9/1996 | Blonder | |
| 5,585,866 A | 12/1996 | Miller et al. | |
| 5,589,893 A * | 12/1996 | Gaughan et al. | 725/37 |
| 5,594,469 A * | 1/1997 | Freeman et al. | 345/158 |
| 5,594,509 A | 1/1997 | Florin et al. | |
| 5,602,597 A | 2/1997 | Bertram | |
| 5,604,544 A | 2/1997 | Bertram | |
| 5,606,374 A | 2/1997 | Bertram | |
| 5,650,827 A * | 7/1997 | Tsumori et al. | 725/59 |
| 5,652,630 A | 7/1997 | Bertram et al. | |
| 5,659,369 A * | 8/1997 | Imaiida | 348/556 |
| 5,677,708 A | 10/1997 | Matthews, III et al. | |
| 5,682,489 A | 10/1997 | Harrow et al. | |
| 5,721,815 A | 2/1998 | Ottesen et al. | |
| 5,721,878 A | 2/1998 | Ottesen et al. | |
| 5,742,286 A | 4/1998 | Kung et al. | |
| 5,751,883 A | 5/1998 | Ottesen et al. | |
| 5,754,258 A | 5/1998 | Hanaya et al. | |
| 5,767,840 A | 6/1998 | Selker | |
| 5,768,158 A | 6/1998 | Adler et al. | |
| 5,774,186 A | 6/1998 | Brodsky et al. | |
| 5,786,805 A | 7/1998 | Barry | |
| 5,801,747 A | 9/1998 | Bedard | |
| 5,805,235 A | 9/1998 | Bedard | |
| 5,809,265 A | 9/1998 | Blair et al. | |
| 5,815,216 A * | 9/1998 | Suh | 348/588 |
| 5,825,361 A | 10/1998 | Rubin et al. | |
| 5,831,591 A * | 11/1998 | Suh | 715/201 |
| 5,831,607 A | 11/1998 | Brooks | |
| 5,867,162 A | 2/1999 | O'Leary et al. | |
| 5,874,953 A | 2/1999 | Webster et al. | |
| 5,898,431 A | 4/1999 | Webster et al. | |
| 5,905,496 A | 5/1999 | Lau et al. | |
| 5,917,488 A | 6/1999 | Anderson et al. | |
| 5,917,489 A | 6/1999 | Thurlow et al. | |
| 5,936,623 A | 8/1999 | Amro | |
| 5,949,417 A | 9/1999 | Calder | |
| 5,956,025 A | 9/1999 | Goulden et al. | |
| 5,966,121 A | 10/1999 | Hubbell et al. | |
| 5,978,043 A | 11/1999 | Blonstein et al. | |
| 5,999,228 A | 12/1999 | Matsuura et al. | |
| 6,005,565 A | 12/1999 | Legall | |
| 6,008,735 A | 12/1999 | Chiloyan et al. | |
| 6,008,860 A * | 12/1999 | Patton et al. | 348/565 |
| 6,018,342 A | 1/2000 | Bristor | |
| 6,020,930 A | 2/2000 | Legrand | |
| 6,052,121 A | 4/2000 | Webster et al. | |
| 6,057,841 A | 5/2000 | Thurlow et al. | |
| 6,064,376 A | 5/2000 | Berezowski et al. | |
| 6,078,308 A | 6/2000 | Rosenberg et al. | |
| 6,088,029 A | 7/2000 | Guiberson et al. | |
| 6,118,442 A | 9/2000 | Tanigawa | |
| 6,118,498 A | 9/2000 | Reitmeier | |
| 6,125,374 A | 9/2000 | Terry et al. | |
| 6,141,003 A * | 10/2000 | Chor et al. | 715/719 |
| 6,147,714 A | 11/2000 | Terasawa et al. | |
| 6,173,112 B1 | 1/2001 | Gruse et al. | |
| 6,191,773 B1 * | 2/2001 | Maruno et al. | 345/158 |
| 6,208,341 B1 | 3/2001 | van Ee et al. | |
| 6,208,804 B1 | 3/2001 | Ottesen et al. | |
| 6,215,417 B1 * | 4/2001 | Krass et al. | 341/20 |
| 6,266,098 B1 * | 7/2001 | Cove et al. | 348/563 |
| 6,334,217 B1 | 12/2001 | Kim | |
| 6,493,036 B1 * | 12/2002 | Fernandez | 348/561 |
| 6,498,628 B2 * | 12/2002 | Iwamura | 348/734 |
| 6,526,577 B1 | 2/2003 | Knudson et al. | |
| 6,529,685 B2 | 3/2003 | Ottesen et al. | |
| 6,556,252 B1 * | 4/2003 | Kim | 348/565 |
| 6,650,248 B1 | 11/2003 | O'Donnell et al. | |
| 6,678,009 B2 * | 1/2004 | Kahn | 348/569 |
| 6,697,123 B2 * | 2/2004 | Janevski et al. | 348/565 |
| 6,750,803 B2 | 6/2004 | Yates et al. | |
| 6,750,887 B1 | 6/2004 | Kellerman et al. | |
| 6,774,914 B1 * | 8/2004 | Benayoun | 345/650 |
| 6,804,824 B1 | 10/2004 | Potrebic et al. | |
| 6,822,698 B2 * | 11/2004 | Clapper | 348/734 |
| 6,882,712 B1 | 4/2005 | Iggulden et al. | |
| 6,934,963 B1 | 8/2005 | Reynolds et al. | |
| 6,943,845 B2 * | 9/2005 | Mizutome et al. | 348/555 |
| 7,046,161 B2 | 5/2006 | Hayes | |
| 7,061,544 B1 * | 6/2006 | Nonomura et al. | 348/568 |
| 7,148,909 B2 * | 12/2006 | Yui | G06F 3/14 345/660 |
| 7,171,622 B2 * | 1/2007 | Bhogal | 715/730 |
| 7,196,733 B2 * | 3/2007 | Aratani et al. | 348/581 |
| 7,206,029 B2 * | 4/2007 | Cohen-Solal | 348/565 |
| 7,225,456 B2 | 5/2007 | Kitsukawa et al. | |
| 7,231,603 B2 * | 6/2007 | Matsumoto | 715/716 |
| 7,268,830 B2 * | 9/2007 | Lee | 348/565 |
| 7,370,284 B2 | 5/2008 | Andrea et al. | |
| 7,420,620 B2 * | 9/2008 | Habas et al. | 348/565 |
| 7,434,246 B2 | 10/2008 | Florence | |
| 7,440,036 B2 * | 10/2008 | Onomatsu et al. | 348/581 |
| 7,584,492 B2 | 9/2009 | Terakado et al. | |
| 7,600,201 B2 | 10/2009 | Endler et al. | |
| 7,636,131 B2 * | 12/2009 | Hsieh et al. | 348/716 |
| 7,707,599 B1 | 4/2010 | Groff et al. | |
| 7,746,332 B2 * | 6/2010 | Le Leannec et al. | 345/204 |
| 7,876,382 B2 * | 1/2011 | Imaizumi | 348/565 |
| 7,880,813 B2 * | 2/2011 | Nakamura et al. | 348/569 |
| 8,001,566 B2 | 8/2011 | Jang | |
| 8,005,826 B1 | 8/2011 | Sahami et al. | |
| 8,239,784 B2 * | 8/2012 | Hotelling et al. | 715/830 |
| 8,487,874 B2 * | 7/2013 | Lin | G06F 3/14 345/156 |
| 8,928,669 B2 * | 1/2015 | Kobayashi | G09G 5/003 345/204 |
| 2001/0011953 A1 | 8/2001 | Shintani et al. | |
| 2001/0017672 A1 | 8/2001 | Verhaeghe | |
| 2001/0042245 A1 * | 11/2001 | Iwamura | G08C 23/00 725/1 |
| 2002/0054062 A1 | 5/2002 | Gerba et al. | |
| 2002/0057382 A1 | 5/2002 | Yui | |
| 2002/0060754 A1 | 5/2002 | Takeuchi | |
| 2002/0070957 A1 * | 6/2002 | Trajkovic et al. | 345/719 |
| 2002/0075333 A1 | 6/2002 | Dutta et al. | |
| 2002/0075407 A1 * | 6/2002 | Cohen-Solal | 348/565 |
| 2002/0097229 A1 | 7/2002 | Rose et al. | |
| 2002/0109669 A1 * | 8/2002 | Ha | G09G 5/14 345/156 |
| 2002/0122027 A1 | 9/2002 | Kim | |
| 2002/0122079 A1 | 9/2002 | Kamen et al. | |
| 2002/0178446 A1 | 11/2002 | Sie et al. | |
| 2002/0191954 A1 | 12/2002 | Beach | |
| 2003/0001908 A1 * | 1/2003 | Cohen-solal | 345/863 |
| 2003/0005443 A1 * | 1/2003 | Axelsson et al. | 725/46 |
| 2003/0005445 A1 | 1/2003 | Schein et al. | |
| 2003/0018973 A1 | 1/2003 | Thompson | |
| 2003/0025716 A1 * | 2/2003 | Colavin | 345/684 |
| 2003/0066079 A1 | 4/2003 | Suga | |
| 2003/0086694 A1 | 5/2003 | Davidsson | |
| 2003/0115589 A1 | 6/2003 | D'Souza et al. | |
| 2003/0126607 A1 | 7/2003 | Phillips et al. | |
| 2003/0131356 A1 | 7/2003 | Proehl et al. | |
| 2003/0191947 A1 | 10/2003 | Stubblefield et al. | |
| 2003/0193426 A1 | 10/2003 | Vidal | |
| 2003/0208751 A1 * | 11/2003 | Kim et al. | 725/1 |
| 2004/0041723 A1 | 3/2004 | Shibamiya et al. | |
| 2004/0070593 A1 | 4/2004 | Neely et al. | |
| 2004/0075770 A1 * | 4/2004 | Lee | H04N 5/44543 348/565 |
| 2004/0111744 A1 | 6/2004 | Bae et al. | |
| 2004/0168191 A1 | 8/2004 | Jerding et al. | |
| 2004/0172651 A1 | 9/2004 | Wasilewski et al. | |
| 2004/0201780 A1 * | 10/2004 | Kim | 348/565 |
| 2004/0218905 A1 | 11/2004 | Green et al. | |
| 2004/0230843 A1 | 11/2004 | Jansen | |
| 2004/0255336 A1 | 12/2004 | Logan et al. | |
| 2005/0002649 A1 | 1/2005 | Boyle et al. | |

(56) References Cited

U.S. PATENT DOCUMENTS

| | | |
|---|---|---|
| 2005/0010949 A1 | 1/2005 | Ward et al. |
| 2005/0084233 A1* | 4/2005 | Fujii et al. .................... 386/37 |
| 2005/0128366 A1* | 6/2005 | Cha .............................. 348/837 |
| 2005/0188402 A1 | 8/2005 | de Andrade et al. |
| 2005/0251826 A1 | 11/2005 | Orr |
| 2005/0268100 A1 | 12/2005 | Gasparini et al. |
| 2006/0037047 A1 | 2/2006 | DeYonker et al. |
| 2006/0051058 A1 | 3/2006 | Rudolph et al. |
| 2006/0061688 A1 | 3/2006 | Choi |
| 2006/0084409 A1 | 4/2006 | Ghadiali |
| 2006/0095401 A1 | 5/2006 | Krikorian et al. |
| 2006/0197920 A1* | 9/2006 | Furui ..................... G03B 21/00 353/69 |
| 2006/0236342 A1 | 10/2006 | Kunkel et al. |
| 2007/0019111 A1* | 1/2007 | Won .............................. 348/569 |
| 2007/0039019 A1 | 2/2007 | Collier |
| 2007/0039020 A1 | 2/2007 | Cansler, Jr. et al. |
| 2007/0052851 A1* | 3/2007 | Ochs ................... H04N 5/44513 348/556 |
| 2007/0061724 A1 | 3/2007 | Slothouber et al. |
| 2007/0074254 A1 | 3/2007 | Sloo |
| 2007/0079334 A1 | 4/2007 | Silver |
| 2007/0115391 A1* | 5/2007 | Anderson .................... 348/565 |
| 2007/0130607 A1 | 6/2007 | Thissen et al. |
| 2007/0136681 A1* | 6/2007 | Miller ................. G06F 3/04817 715/782 |
| 2007/0192791 A1 | 8/2007 | Sullivan et al. |
| 2007/0195197 A1 | 8/2007 | Seong et al. |
| 2007/0199022 A1 | 8/2007 | Moshiri et al. |
| 2007/0266397 A1* | 11/2007 | Lin ................................. 725/37 |
| 2007/0275762 A1* | 11/2007 | Aaltone ............. H04N 5/44543 455/566 |
| 2007/0277224 A1 | 11/2007 | Osborn et al. |
| 2008/0010518 A1 | 1/2008 | Jiang et al. |
| 2008/0016209 A1* | 1/2008 | VanHarlingen ......... G06F 3/023 709/224 |
| 2008/0024682 A1 | 1/2008 | Chen |
| 2008/0034314 A1 | 2/2008 | Louch et al. |
| 2008/0052245 A1 | 2/2008 | Love |
| 2008/0066102 A1 | 3/2008 | Abraham et al. |
| 2008/0074550 A1* | 3/2008 | Park .............................. 348/565 |
| 2008/0088495 A1 | 4/2008 | Kawakita |
| 2008/0129886 A1 | 6/2008 | Ishihara |
| 2008/0147803 A1 | 6/2008 | Krzyzanowski et al. |
| 2008/0184324 A1 | 7/2008 | Yun et al. |
| 2008/0222523 A1 | 9/2008 | Fox et al. |
| 2008/0229254 A1 | 9/2008 | Warner |
| 2008/0231762 A1 | 9/2008 | Hardacker et al. |
| 2008/0235735 A1 | 9/2008 | Wroblewski |
| 2008/0263595 A1 | 10/2008 | Sumiyoshi et al. |
| 2009/0007209 A1 | 1/2009 | Kawai |
| 2009/0031335 A1 | 1/2009 | Hendricks et al. |
| 2009/0031343 A1* | 1/2009 | Sharkey ........................ 725/39 |
| 2009/0141024 A1* | 6/2009 | Lee .......................... H04N 5/45 345/420 |
| 2009/0241145 A1 | 9/2009 | Sharma |
| 2009/0307731 A1* | 12/2009 | Beyabani ........... H04N 5/44543 725/87 |
| 2010/0037271 A1* | 2/2010 | Crowe .................... H04N 5/45 725/68 |
| 2010/0050199 A1 | 2/2010 | Kennedy |
| 2010/0071004 A1 | 3/2010 | Wightman |
| 2010/0074592 A1 | 3/2010 | Taxier et al. |
| 2010/0077432 A1 | 3/2010 | VanDuyn et al. |
| 2010/0079681 A1 | 4/2010 | Coburn et al. |
| 2010/0083309 A1 | 4/2010 | White et al. |
| 2010/0083310 A1 | 4/2010 | VanDuyn et al. |
| 2010/0083312 A1 | 4/2010 | White et al. |
| 2010/0083313 A1 | 4/2010 | White et al. |
| 2010/0083319 A1 | 4/2010 | Martch et al. |
| 2010/0088331 A1 | 4/2010 | White et al. |
| 2010/0100909 A1 | 4/2010 | Arsenault et al. |
| 2010/0115550 A1 | 5/2010 | Minnick et al. |
| 2010/0169958 A1 | 7/2010 | Werner et al. |
| 2010/0194689 A1* | 8/2010 | Gong ......................... G06F 3/14 345/163 |
| 2010/0245557 A1* | 9/2010 | Luley, III ............. G02B 21/367 348/79 |
| 2012/0001942 A1* | 1/2012 | Abe ........................ G09G 5/003 345/650 |

FOREIGN PATENT DOCUMENTS

| | | |
|---|---|---|
| WO | 0001142 A1 | 1/2000 |
| WO | 0145395 A | 6/2001 |
| WO | 0178054 A1 | 10/2001 |
| WO | 0178383 A2 | 10/2001 |
| WO | 02087243 A | 10/2002 |
| WO | 03043320 A2 | 5/2003 |
| WO | 2006119269 A2 | 11/2006 |
| WO | 2006127211 A2 | 11/2006 |
| WO | 2007015047 A2 | 2/2007 |
| WO | 2008013350 A2 | 1/2008 |

OTHER PUBLICATIONS

USPTO "Final Office Action" mailed May 13, 2011; U.S. Appl. No. 12/242,587, filed Sep. 30, 2008.

European Patent Office, International Searching Authority, "International Search Report" mailed Nov. 10, 2009; International Appln. No. PCT/EP2009/061499.

USPTO "Non-Final Office Action" mailed Jan. 31, 2011; U.S. Appl. No. 12/233,274, filed Sep. 18, 2008.

Wikipedia, the free encyclopedia, "Dashboard (Software)," Retrieved from the Internet on Oct. 6, 2008, http://en.wikipedia.org/w/index.php?title=Dashboard_(software)&printable=yes.

Nintendo, "Wii Operations Manual System Setup," 2007.

USPTO "Non-Final Office Action" mailed Dec. 21, 2010; U.S. Appl. No. 12/235,476, filed Sep. 22, 2008.

USPTO "Non-Final Office Action" mailed Mar. 31, 2011; U.S. Appl. No. 12/241,556, filed Sep. 30, 2008.

International Searching Authority, European Patent Office, "International Search Report," mailed Feb. 4, 2010; International Application No. PCT/US2009/058937, filed Sep. 30, 2009.

International Searching Authority, European Patent Office, "International Search Report," mailed Feb. 16, 2010; International Application No. PCT/US2009/057582, filed Sep. 18, 2009.

Wightman, Robert Edward "Methods and Apparatus for Providing Multiple Channel Recall on a Television Receiver," U.S. Appl. No. 12/233,274, filed Sep. 18, 2008.

White, James Matthew et al. "Systems and Methods for Configuration of a Remote Control Device," U.S. Appl. No. 12/241,550, filed Sep. 30, 2008.

White, James Matthew et al. "Systems and Methods for Graphical control of User Interface Features Provided by a Television Receiver," U.S. Appl. No. 12/241,556, filed Sep. 30, 2008.

Minnick, Danny Jean et al., "Graphical Interface Navigation Based on Image Element Proximity," U.S. Appl. No. 12/609,860, filed Oct. 30, 2009.

White, James Matthew et al. "Systems and Methods for Providing Customer Service Features Via a Graphical User Interface in a Television Receiver," U.S. Appl. No. 12/241,580, filed Sep. 30, 2008.

Martch, Henry Gregg "Systems and Methods for Automatic Configuration of a Remote Control Device," U.S. Appl. No. 12/242,089, filed Sep. 30, 2008.

White, James Matthew et al. "Systems and Methods for Graphical Control of User Interface Features in a Television Receiver," U.S. Appl. No. 12/241,599, filed Sep. 30, 2008.

Coburn, Matthew et al. "Systems and Methods for Graphical Control of Symbol-Based Features in a Television Receiver," U.S. Appl. No. 12/241,604, filed Sep. 30, 2008.

White, James Matthew et al. "Systems and Methods for Graphical Adjustment of an Electronic Program Guide," U.S. Appl. No. 12/241,608, filed Sep. 30, 2008.

Vanduyn, Luke et al. "Methods and Apparatus for Presenting Supplemental Information in an Electronic Programming Guide," U.S. Appl. No. 12/235,476, filed Sep. 22, 2008.

(56) References Cited

OTHER PUBLICATIONS

Vanduyn, Luke et al. "Methods and Apparatus for Providing Multiple Channel Recall on a Television Receiver," U.S. Appl. No. 12/242,587, filed Sep. 30, 2008.
Taxier, Karen Michelle et al. "Methods and Apparatus for Visually Displaying Recording Timer Information," U.S. Appl. No. 12/235,464, filed Sep. 22, 2008.
Martch, Henry Gregg et al. "Methods and Apparatus for Locating Content in an Electronic Programming Guide," U.S. Appl. No. 12/242,614, filed Oct. 17, 2008.
Taxier, Karen Michelle et al. "Apparatus and Methods for Dynamic Pictorial Image Authentication," U.S. Appl. No. 12/236,430, filed Sep. 23, 2008.
USPTO "Non-Final Office Action" mailed Nov. 24, 2010; U.S. Appl. No. 12/242,587, filed Sep. 30, 2008.
USPTO "Non-Final Office Action" mailed Jan. 12, 2011; U.S. Appl. No. 12/241,580, filed Sep. 30, 2008.
USPTO "Non-Final Office Action" mailed Jan. 28, 2011; U.S. Appl. No. 12/236,430, filed Sep. 23, 2008.
USPTO "Non-Final office Action" mailed Feb. 4, 2011; U.S. Appl. No. 12/241,599, filed Sep. 30, 2008.
USPTO "Non-Final Office Action" mailed Feb. 9, 2011; U.S. Appl. No. 12/241,608, filed Sep. 30, 2008.
International Searching Authority, European Patent Office, "International Search Report," mailed Dec. 7, 2009; International Application No. PCT/US2009/058457, filed Sep. 25, 2009.
International Searching Authority, European Patent Office, "International Search Report and Written Opinion," mailed Dec. 18, 2009; International Application No. PCT/US2009/058456, filed Sep. 25, 2009.
International Searching Authority, European Patent Office, "International Search Report and Written Opinion," mailed Dec. 21, 2009; International Application No. PCT/US2009/058454 filed Sep. 25, 2009.
Anonymous "ZigBee," Wikipedia, the Free Encyclopedia [online], Sep. 26, 2008, XP002558439; retrieved from the Internet: <URL:http://en.wikipedia.org/w/index.php?title=ZigBee &oldid=241085798> [retrieved on Dec. 2, 2009].
International Searching Authority, European Patent Office, Annex to Form PCT/ISA/206, Communication Relating to the Results of the Partial International Search, mailed Nov. 16, 2009; International Application No. PCT/US2009/057825, filed Sep. 22, 2009.
United States Patent and Trademark Office, Final Office Action for U.S. Appl. No. 12/241,599, dated Aug. 26, 2011.
USPTO "Final Office Action" mailed Jun. 23, 2011; U.S. Appl. No. 12/241,580, filed Sep. 30, 2008.
USPTO "Non-Final Office Action" mailed Jul. 12, 2011; U.S. Appl. No. 12/241,604, filed Sep. 30, 2008.
USPTO "Final Office Action" mailed May 13, 2011; U.S. Appl. No. 12/235,476, filed Sep. 22, 2008.
USPTO "Final Office Action" mailed Jul. 28, 2011; U.S. Appl. No. 12/241,608, filed Sep. 30, 2008.
USPTO "Final Office Action" mailed Aug. 18, 2011; U.S. Appl. No. 12/233,274, filed Sep. 18, 2008.
USPTO "Non-Final Office Action" mailed Nov. 23, 2011; U.S. Appl. No. 12/242,614, filed Sep. 30, 2008.
USPTO "Final Office Action" mailed Jan. 20, 2012; U.S. Appl. No. 12/241,604, filed Sep. 30, 2008.
USPTO "Non-Final Office Action" mailed Dec. 6, 2011; U.S. Appl. No. 12/241,580, filed Sep. 30, 2008.
USPTO "Final Office Action" mailed Dec. 7, 2011; U.S. Appl. No. 12/241,599, filed Sep. 30, 2008.
USPTO "Non-Final Office Action" mailed Mar. 7, 2012; U.S. Appl. No. 12/235,464, filed Sep. 22, 2008.
USPTO "Non-Final Office Action" mailed Mar. 22, 2012; U.S. Appl. No. 12/241,556, filed Sep. 30, 2008.
USPTO "Non-Final Office Action" mailed Apr. 17, 2012; U.S. Appl. No. 12/241,608, filed Sep. 30, 2008.
USPTO "Final Office Action" mailed Apr. 25, 2012; U.S. Appl. No. 12/242,614, filed Sep. 30, 2008.
USPTO "Non-Final Office Action" mailed Apr. 24, 2012; U.S. Appl. No. 12/235,476, filed Sep. 22, 2008.
USPTO "Final Office Action" mailed Oct. 5, 2011; U.S. Appl. No. 12/241,556, filed Sep. 30, 2008.
USPTO "Final Office Action" mailed Sep. 14, 2012 for U.S. Appl. No. 12/242,587, filed Sep. 30, 2008.
USPTO "Final Office Aciton" mailed Oct. 9, 2012 for U.S. Appl. No. 12/235,464, filed Sep. 22, 2008.
USPTO "Final Office Action" mailed Aug. 8, 2012 for U.S. Appl. No. 12/241,556, filed Sep. 30, 2008.
USPTO "Final Office Action" mailed Jul. 17, 2012 for U.S. Appl. No. 12/241,580, filed Sep. 30, 2008.
USPTO "Non-Final Office Action" mailed Jul. 26, 2012 for U.S. Appl. No. 12/609,860, filed Oct. 30, 2009.
USPTO "Final Office Action" mailed Aug. 1, 2012 for U.S. Appl. No. 12/241,608, filed Sep. 30, 2008.
USPTO "Final Office Action" mailed Aug. 2, 2012 for U.S. Appl. No. 12/241,599, filed Sep. 30, 2008.
USPTO "Final Office Action" mailed Aug. 9, 2012 for U.S. Appl. No. 12/235,476, filed Sep. 22, 2008.
United States Patent and Trademark Office, Office Action for U.S. Appl. No. 12/242,587, dated Jun. 5, 2012.

\* cited by examiner

SYSTEMS AND METHODS FOR GRAPHICAL CONTROL OF PICTURE-IN-PICTURE WINDOWS

TECHNICAL FIELD

The present invention generally relates to television viewing, and more particularly relates to systems and methods for providing graphical control of picture-in-picture windows displayed by set-top boxes or other television receivers.

BACKGROUND

Most television viewers now receive their television signals through a content aggregator such as a cable or satellite television provider. For subscribers to a direct broadcast satellite (DBS) service, for example, television programming is received via a broadcast that is sent via a satellite to an antenna that is generally located on the exterior of a home or other structure. Other customers receive television programming through conventional television broadcasts, or through cable, wireless or other media. Programming is typically received at a receiver such as a "set top box" (STB) or other receiver that demodulates the received signals and converts the demodulated content into a format that can be presented to the viewer on a television or other display.

In addition to receiving and demodulating television programming, many television receivers are able to provide additional features. Examples of features available in many modern television receivers include electronic program guides (EPGs), digital or other personal video recorders, "place-shifting" features for streaming received content over a network or other medium, and/or the ability to simultaneously view multiple programs showing on different channels. In the latter case, a "picture-in-picture" (PIP) display is typically provided wherein a relatively small image of a secondary program is superimposed upon a primary display. While television viewers have widely adopted PIP functionality, there nevertheless remains a desire to improve the configurability of PIP features. Moreover, there is a continual desire for more efficient and intuitive user interfaces to the various other features provided by the television receiver, including PIP features.

It is therefore desirable to create systems and methods improving the viewer interface to the television receiver for features such as picture-in-picture. These and other desirable features and characteristics will become apparent from the subsequent detailed description and the appended claims, taken in conjunction with the accompanying drawings and this background section.

BRIEF SUMMARY

According to various exemplary embodiments, systems and methods are provided for presenting a picture-in-picture (PIP) window on a television or other display generated by a set-top box (STB) or other video receiver.

In various embodiments, the picture-in-picture window is presented in conjunction with a navigation feature on the display. A two-dimensional input associated with the navigation feature is received from a remote control having a touchpad, directional pad, joystick, trackball, set of directional buttons and/or any other two-dimensional input device. The picture-in-picture window on the display is appropriately moved, resized, reordered or otherwise adjusted in response to the two-dimensional input.

In other embodiments, a video receiver suitably comprises a receiver interface configured to receive an incoming modulated signal and a decoder configured to decode the incoming modulated signal to obtain primary and secondary video signals. The video receiver further comprises a wireless receiver configured to receive a two-dimensional input signal, and a processor configured to generate an output image comprising the primary and secondary video signals in a picture-in-picture window in conjunction with a navigation feature and to adjust the picture-in-picture window on the display when the two-dimensional input signal corresponds to the navigation feature.

Still other embodiments provide a system for presenting television content on a display. A wireless remote control comprises a two-dimensional input device configured to provide a two-dimensional input signal in response to a user input. A video receiver comprises a receiver interface configured to receive an incoming modulated signal, a decoder configured to decode the incoming modulated signal to obtain primary and secondary video signals. The receiver further comprises a wireless receiver configured to receive the two-dimensional input signal from the wireless remote control, and a processor configured to generate an output image to be presented on the display, wherein the output image comprises the secondary video signal superimposed on the primary video signal in a picture-in-picture window in proximity to a plurality of directional indicators, and wherein processor is further configured to relocate the picture-in-picture window on the display when the two-dimensional input signal corresponds to one of the plurality of directional indicators.

Various other embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Generally speaking, control of picture-in-picture (PIP) functionality can be substantially improved by allowing two-dimensional interaction with the PIP window. The PIP window may be moved, resized and/or otherwise modified, for example, by providing any number of arrow buttons or other directional indicators on the screen that can be "clicked" or otherwise actuated in response to two-dimensional inputs received from the viewer. By allowing for two-dimensional interaction with the PIP window, the convenience of the PIP feature is greatly improved while simplifying the viewer's interaction with the display.

Figure 1:
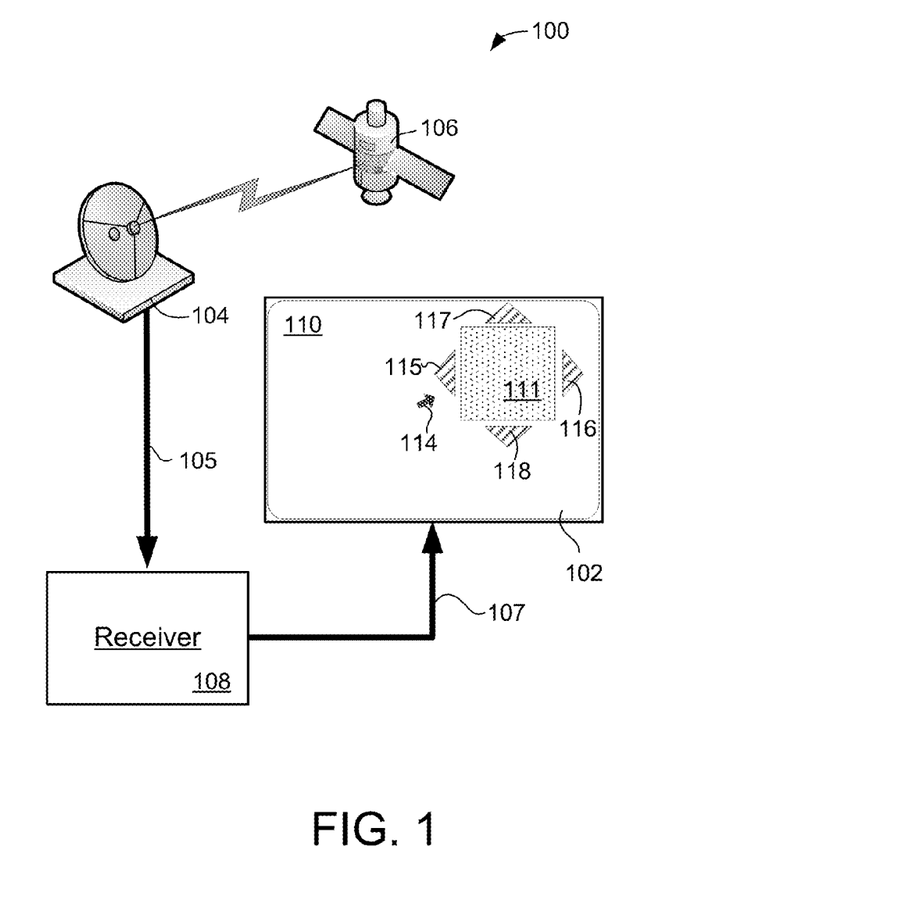
FIG. 1 is a block diagram of an exemplary television receiver system.

Turning now to the drawing figures and with initial reference to FIG. 1, an exemplary system 100 for presenting television signals to a viewer suitably includes a receiver 108 that receives signals 105 in any format and generates appropriate outputs 107 to generate imagery 110 on display 102. Typically, receiver 108 interacts with a wireless remote control 112, which may include any sort of two-dimensional input device 124 for producing two-dimensional input signals 125 in response to viewer inputs.

Television imagery is presented on display 102 as desired by the viewer. In various embodiments, a PIP window 111 may be presented overlying a primary window 110 to allow simultaneous viewing of multiple programs. Further, two-dimensional navigation features (e.g., arrows 115-118) may be presented to allow the viewer to manipulate PIP window 111 through control of a cursor 114 or other interface feature via remote control 112. In various embodiments, cursor 114 is able to move in response to two-dimensional input signals 125, which are, in turn, generated in response to inputs applied to two-dimensional input device 124. By moving cursor 114 to interact with the two-dimensional navigation features presented on display 102, PIP window 111 may be moved, resized, re-aligned or otherwise manipulated as desired.

Receiver 108 is any component, device or logic capable of receiving and decoding video signals 105. In various embodiments, receiver 108 is a set-top box (STB) or the like capable of receiving satellite, cable, broadcast and/or other signals encoding audio/visual content. Receiver 108 may further demodulate or otherwise decode the received signals 105 to extract programming that can be locally viewed on display 102 as desired. Receiver 108 may also include a content database stored on a hard disk drive, memory, or other storage medium to support a digital or other personal video recorder (DVR/PVR) feature as appropriate. Receiver 108 may also provide place shifting, electronic program guide, multi-stream viewing and/or other features as appropriate.

In the exemplary embodiment illustrated in FIG. 1, receiver 108 is shown receiving digital broadcast satellite (DBS) signals 105 from a satellite 106 at an antenna 104. Equivalent embodiments, however, could receive programming 105 from one or more programming sources, including any sort of satellite, cable or broadcast source, as well as any Internet or other network source or the like. In embodiments that include DVR functionality, programming may be stored in any sort of database as desired (e.g., in response to user/viewer programming instructions) for subsequent viewing. Content may also be received from digital versatile disks (DVDs) or other removable media in some embodiments.

Display 102 is any device capable of presenting imagery to a viewer. In various embodiments, display 102 is a conventional television set, such as any sort of television operating in accordance with any digital or analog protocols, standards or other formats. Display 102 may be a conventional NTSC or PAL television receiver, for example. In other embodiments, display 102 is a monitor or other device that may not include built-in receiver functionality, but that is nevertheless capable of presenting imagery in response to signal 107 received from receiver 108. In various embodiments, receiver 108 and display 102 may be physically combined or interconnected in any manner. A receiver card, for example, could be inserted into a slot or other interface in a conventional television, or the functionality of receiver 108 may be provided within a conventional television display 102. In other embodiments, signals 107 are transferred between receiver 108 and display 102 using any sort of cable or other interface (including a wireless interface). Examples of common interfaces include, without limitation, component video, S-video, High-Definition Multimedia Interface (HDMI), Digital Visual Interface (DVI), IEEE 1394, and/or any other formats as desired.

Remote control 110 is any sort of control device capable providing signals 125 to receiver 108 that represent inputs received from one or more viewers. In various embodiments, remote control 110 is an infrared, radio frequency (RF) or other wireless remote that includes any number of buttons or other features for receiving viewer inputs. In an exemplary embodiment, remote control 110 communicates with receiver 108 using the IEEE 802.15.4 ("ZIGBEE") protocol for wireless personal area networks (WPANs), although other embodiments may instead communicate using IEEE 802.15.1 ("BLUETOOTH"), IEEE 802.11 ("WI-FI"), conventional infrared, and/or any other wireless techniques.

In further embodiments, remote control 110 includes a two-dimensional input device 124 that is able to receive inputs from the user in any multi-dimensional format (e.g, "X,Y", "r,Θ", and/or the like). Examples of two-dimensional input devices 124 that could be used in various embodiments include, without limitation, touchpads, directional pads, joysticks, trackballs, sets of arrows or other buttons, and/or the like. In a typical implementation, two-dimensional input device 124 provides coordinates or other signals 125 that indicate absolute (e.g., "X,Y") and/or relative (e.g., "ΔX, ΔY") movement in two or more dimensions. Such signals 125 may be decoded at controller 108 or elsewhere to coordinate the viewer's actions with respect to input device 124 to movement of cursor 114 or other features presented on display 102.

In the exemplary embodiment shown in FIG. 1, remote control 110 is illustrated with a touchpad-type device 124 that accepts viewer inputs applied with a finger, stylus or other object. FIG. 1 also shows touchpad device 124 as having dedicated scroll regions 122 and 128 for vertical and horizontal scrolling, respectively. Viewer movements within region 122 that is more-or-less parallel to the right edge of device 124, for example, could result in vertical scrolling, whereas movements within region 128 that are more-or-less parallel to the bottom edge of device 124 could result in horizontal scrolling. Dedicated scrolling regions 122, 128 are optional features, however, that may not be present in all embodiments. Further, scrolling from a touchpad or other device 124 could be implemented in any other manner.

In operation, then, receiver 108 suitably receives television signals 105 from a satellite, cable, broadcast or other source. Signals 105 typically encompass multiple channels that can be simultaneously viewed. In a satellite based embodiment, for example, a primary channel and a secondary channel can be extracted from a common satellite feed. One or more cable or broadcast channels may also be obtained in any manner. In other embodiments, receiver 108 may obtain multiple channel signals from different sources (e.g., one channel from a cable or satellite source and another channel from a terrestrial broadcast, DVD or other source).

Receiver 108 suitably obtains the desired content from the channel(s) indicated by the viewer, and presents the content on display 102. In various embodiments, primary and secondary channels may be presented in a conventional PIP window 111, with the secondary channel superimposed upon (e.g, presented in a smaller window within) the imagery 110 obtained from the primary channel.

The viewer is able to interact with PIP window 111 in any manner. In various embodiments, the viewer is able to move a cursor or similar pointer 114 on display 102 using two-dimensional input device 124. By pointing to various interface features that are presented in association with PIP window 111, the viewer may be able to move, resize or otherwise adjust the window 111 as desired. The exemplary embodiment shown in FIG. 1, for example, shows four directional arrows 115, 116, 117 and 118 (corresponding to movement in left, right, up and down directions, respectively) that can be "clicked" or otherwise indicated to move window 111 in a desired direction. Although not specifically shown in FIG. 1, other icons could be present to allow resizing, reordering, swapping of primary/secondary content, and/or other features as desired. In still other embodiments, window 111 could be presented with a drag bar or other feature that would allow dragging of window 111 to a desired position within display 110, as described more fully below.

Figure 2:
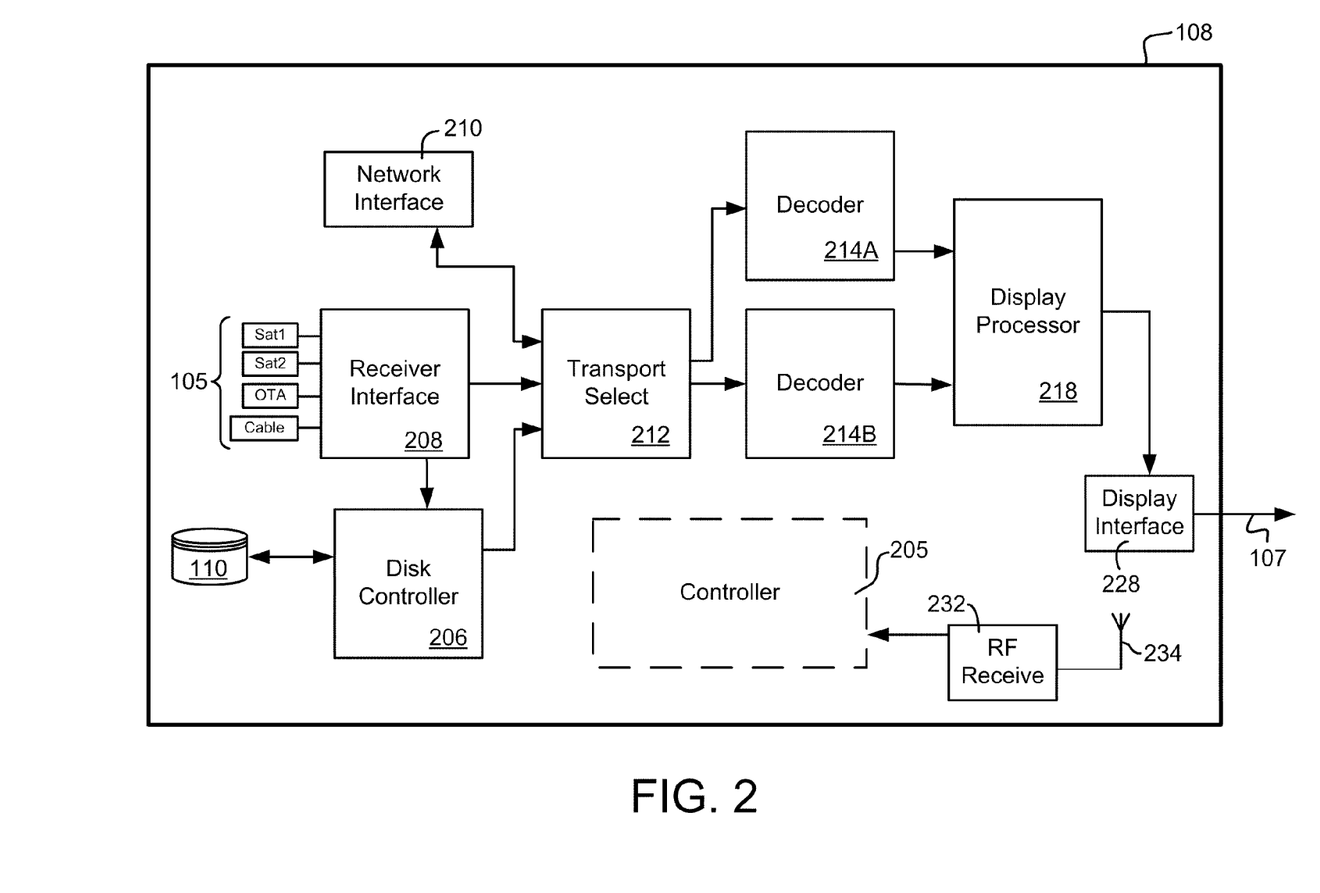
FIG. 2 is a block diagram of an exemplary television receiver device.

FIG. 2 provides additional detail about an exemplary receiver 108 that includes a receiver interface 208, a decoder 214 and a display processor 218, as appropriate. FIG. 2 also shows a disk controller interface 206 to a disk or other storage device 110, an interface 210 to a local or wide area network, a transport select module 212, a display interface 228, an RF receiver module and control logic 205. Other embodiments may incorporate additional or alternate processing modules from those shown in FIG. 2, may omit one or more modules shown in FIG. 2, and/or may differently organize the various modules in any other manner different from the exemplary arrangement shown in FIG. 2.

Receiver 108 may be physically and logically implemented in any manner. FIG. 2 shows various logical and functional features that may be present in an exemplary device; each module shown in the figure may be implemented with any sort of hardware, software, firmware and/or the like. Any of the various modules may be implemented with any sort of general or special purpose integrated circuitry, for example, such as any sort of microprocessor, microcontroller, digital signal processor, programmed array and/or the like. Any number of the modules shown in FIG. 2, for example, may be implemented as a "system on a chip" (SoC) using any suitable processing circuitry under control of any appropriate control logic 205. In various embodiments, control logic 205 executes within an integrated SoC or other processor that implements receiver interface 208, transport selector 212, decoder 214, display processor 218, disk controller 206 and/or other features, as appropriate. The Broadcom Corporation of Irvine, Calif., for example, produces several models of processors (e.g., the model BCM 7400 family of processors) that are capable of supporting SoC implementations of satellite and/or cable receiver systems, although products from any number of other suppliers could be equivalently used. In still other embodiments, various distinct chips, circuits or components may be inter-connected and inter-relate with each other to implement the receiving and decoding functions represented in FIG. 2.

Various embodiments of receiver 108 therefore include any number of appropriate modules for obtaining and processing media content as desired for the particular embodiment. Each of these modules may be implemented in any combination of hardware and/or software using logic executed within any number of semiconductor chips or other processing logic.

Various embodiments of control logic 205 can include any circuitry, components, hardware, software and/or firmware logic capable of controlling the various components of receiver 108. Various routines, methods and processes executed within receiver 108 are typically carried out under control of control logic 205, as described more fully below. Generally speaking, control logic 205 receives user input signals 125 (FIG. 1) via an RF receiver interface 232 that is able to communicate with the remote control 112 using a suitable antenna 234. Control logic receives user inputs from remote control 112 and/or any other source, and directs the other components of receiver 108 in response to the received inputs to present the desired imagery on display 102.

As noted above, many embodiments of receiver 108 include a receiver interface 208, which is any hardware, software, firmware and/or other logic capable of receiving media content via one or more content sources 105. In various embodiments, content sources 105 may include cable television, DBS, broadcast and/or other programming sources as appropriate. Receiver interface 208 appropriately selects a desired input source and provides the received content to an appropriate destination for further processing. In various embodiments, received programming may be provided in real-time (or near real-time) to a transport stream select module 212 or other component for immediate decoding and presentation to the user. Alternatively, receiver interface 208 may provide content received from any source to a disk or other storage medium in embodiments that provide DVR functionality. In such embodiments, receiver 108 may also include a disk controller module 206 that interacts with an internal or external hard disk, memory and/or other device that stores content in a database 110, as described above.

In the embodiment shown in FIG. 2, receiver 108 also includes an appropriate network interface 210, which operates using any implementation of protocols or other features to support communication by receiver 108 on network 102. In various embodiments, network interface 210 supports conventional LAN, WAN or other protocols (e.g., the TCP/IP or UDP/IP suite of protocols widely used on the Internet) to allow receiver 108 to communicate on the Internet or any other network as desired. Network interface 210 typically interfaces with the network using any sort of LAN adapter hardware, such as a conventional network interface card (NIC) or the like provided within receiver 108.

Transport stream select module 212 is any hardware and/or software logic capable of selecting a desired media stream from the available sources. In the embodiment shown in FIG. 2, stream select module 212 is able to generate video signals for presentation on one or more output interfaces 228. Typically, transport select module 212 responds to viewer inputs (e.g., via control logic 205) to simply switch encoded content received from a broadcast, satellite, cable or other source 105 or from storage 110 to one or more decoder modules 214.

Receiver 108 may include any number of decoder modules 214A-B for decoding, decompressing and/or otherwise processing received/stored content as desired. Generally speaking, decoder modules 214A-B decompress, decode and/or otherwise process received content from stream select module 212 to extract an MPEG or other media stream encoded within the stream. The decoded content can then be processed by one or more display processor modules 218 to create a presentation on display 102 (FIG. 1) for the viewer in any appropriate format. FIG. 2 shows two decoder modules 214A-B operating on two separate signals from transport select module 212. In practice, any number of decoder modules 214 may be used, particularly in PIP settings where multiple signals are simultaneously decoded and displayed. The term "decoder", then, may collectively apply to one or more decoder modules that are able to decode one or more signals for presentation on display 104.

Display processor module 218 includes any appropriate hardware, software and/or other logic to create desired screen displays via display interface 228 as desired. Such displays may include combining signals received from one or more decoder modules 214A-B to facilitate viewing of one or more channels. In various embodiments, display processing module 218 is also able to produce on screen displays (OSDs) for electronic program guide, setup and control, input/output facilitation and/or other features that may vary from embodiment to embodiment. Such displays are not typically contained within the received or stored broadcast stream, but are nevertheless useful to users in interacting with receiver 108 or the like. The generated displays, including received/stored content and any other displays may then be presented to one or more output interfaces 228 in any desired format.

When the viewer requests a PIP window 111, for example, display processor 218 may be operable to receive the desired imagery from one or more decoder modules 214A-B and to create an image with the imagery from the secondary channel superimposed in PIP window 111 on the imagery 110 from the primary channel. Display processor 218 may also generate symbology such as cursor 114 and/or navigational features (e.g., arrows 115-118 in FIG. 1) making up a user interface that allows the viewer to adjust window 111 (or other features) as desired. As receiver 108 receives user inputs 125 from remote control 112, control logic 205 may direct display processor 218 to adjust window 111 or any other feature of imagery 110 as directed by the viewer. Display processor 218 therefore directs the presentation of PIP window 111 in conjunction with one or more navigation features, and adjusts the PIP window 111 in response to inputs received from the viewer.

Display processor 218 produces an output signal encoded in any standard format (e.g., ITU656 format for standard definition television signals or any format for high definition television signals) that can be readily converted to standard and/or high definition television signals at interface 228. In other embodiments, the functionality of display processor 218 and interface 228 may be combined in any manner.

Figure 3:
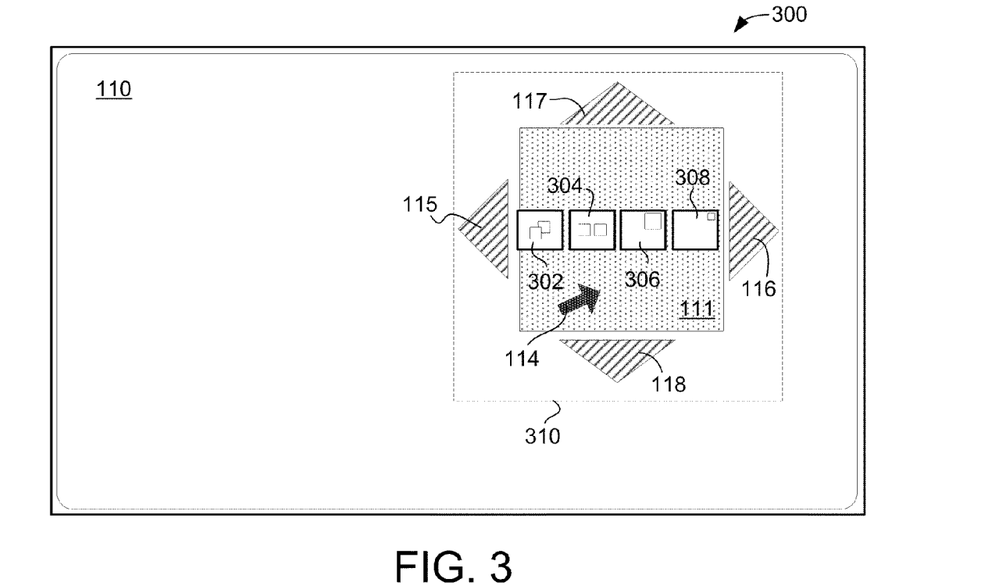
FIGS. 3 and 4 are exemplary screen displays with several types of graphical interaction with PIP features.

Turning now to FIG. 3, an exemplary display 300 suitably includes a PIP window 111 superimposed upon primary imagery 110, as described above. Display 300 also shows navigational features including cursor 114, arrows 115-118, and icons 302, 304, 306 and 308. The viewer moves cursor 115 using, for example, the two dimensional input device 124 associated with remote control 112, and selects the navigational features using any sort of "select" or "enter" feature, such as a "select" key on remote control 112. In various embodiments, the select key functions similar to a conventional select button on a mouse, touchpad or other input device commonly associated with a personal computer or the like.

As noted above, clicking on any of the arrow features 115-118 can have the perceived effect of moving window 111 in the direction of the arrow. Clicking on the "right" arrow 116, for example, could move window 111 from its current position toward the rightmost side of display 300.

The exemplary embodiment of FIG. 3 also shows several icons 302, 304, 306, 308. As shown in FIG. 3, icon 302 can be selected to swap the contents of windows 110 and 111 so that the secondary content becomes the primary content, and vice versa. Icon 304 may be selected to create a "side-by-side" display in which both the primary and secondary content occupy roughly equal proportions of display 110. Icons 306 and 308 can be selected to increase and decrease, respectively, the size of window 111. Other embodiments may provide additional features and/or may omit certain features shown in FIG. 3. Moreover, any number of icons 302, 304, 306, 308 may be present in other embodiments, or icons may be omitted entirely in some embodiments.

Navigation features need not be presented on display 300 at all times. In various embodiments, certain navigational features may be activated or deactivated in response to viewer actions with remote control 112. Cursor 114, for example, may remain hidden until inputs are detected on input device 122 and/or remote control 112. Icons 302, 304, 306, 308 may be obscured until cursor 114 is positioned over or near window 111. Arrows 115-118 may similarly be obscured unless cursor 114 is in proximity to window 111. In various embodiments, arrows 115-118 may be displayed when cursor 114 is within a region 310. Region 310 may be any size or shape, and may coincide with window 111 in various embodiments. Other embodiments may obscure and/or display navigational features in response to different conditions, as desired.

Figure 4:
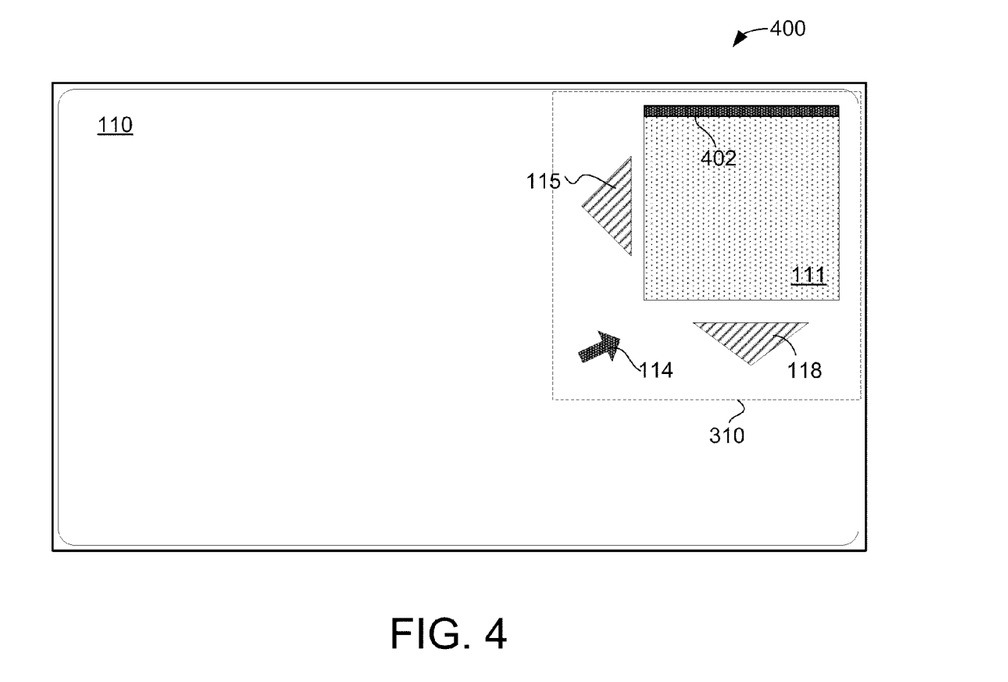

In various further embodiments, some or all of the navigation features presented on display 300 may be altered as conditions warrant. FIG. 4, for example, shows an exemplary display 400 in which the PIP window 111 has moved into the upper right quadrant of the display, making further movement in the upward or rightward directions impractical. In such embodiments, arrows 116 and 117 (FIG. 3) have been removed to disallow further movement in those directions.

FIG. 4 also shows an alternate navigational feature for changing the position of window 111. In various embodiments, arrow features 115-118 are replaced or supplemented with a drag bar feature 402. Drag bar 402 is any bar, button or other feature capable of being selected (e.g., using cursor 114) and dragged to another position on display 400. Drag bar 402 may become displayed or otherwise activated when cursor 114 enters into region 310, as described above, or according to any other parameters. In other embodiments, drag bar 402 is simply a window header that remains relatively static when window 111 is presented on display 400.

Figure 5:
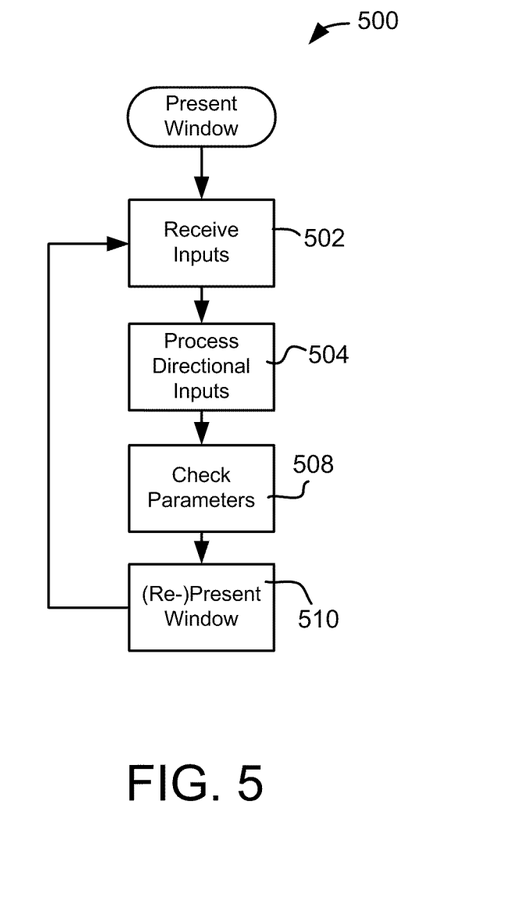
FIG. 5 is a flowchart of an exemplary process for presenting a PIP window.

FIG. 5 shows an exemplary process 500 for presenting a PIP window 111 on a display 102. In various embodiments, the various steps shown in FIG. 5 may be executed using source or object code in any format that may be stored in mass storage, firmware, memory or any other digital storage medium within receiver 104. Such code may be executed by any module or combination of modules operating within receiver 104. In an exemplary embodiment, some or all of the steps shown in process 500 are executed by a display processing module 218 (FIG. 2) operating alone or in conjunction with control logic 205 and/or the various other features shown in FIG. 2 and described above.

With reference now to FIG. 5, an exemplary process 500 suitably includes the broad steps of receiving two-dimensional or other inputs related to the PIP display (steps 502), processing the inputs (step 504) and then presenting window 111 by drawing or re-drawing window 111 as appropriate (step 510). Various other steps or features may be present as well in any number of alternate embodiments.

Process 500 suitably begins by receiver 104 receiving inputs 125 (step 502) from the viewer. In various embodiments, the received inputs are provided from remote control 112 to receiver via RF interface 232 and antenna 234, although other techniques may be used in other embodiments.

Inputs 125 that are relevant to PIP functionality may initially include any sort of indication that the viewer would like to view a PIP window 111; such an indication may be responsive to a "PIP" button on remote control 112, or to a selection of a menu feature generated on display 104. After PIP window 111 is displayed, subsequent inputs 125 may be received from remote control 112 that allow for moving, resizing or other manipulation of the PIP window, as described above. Such inputs 125 may include, for example, two dimensional inputs received from the two-dimensional input device 122 associated with remote control 112 to allow for directional movement, resizing, and/or the like.

Directional inputs 125 may be processed (step 504) in any manner. Control logic 205, for example, may process multi-dimensional inputs from input device 122 to extract and determine the viewer's intent for subsequent processing.

In various embodiments, one or more parameters may be checked prior to presenting (or re-drawing) PIP window 111. Such parameters may include a screen position of PIP window 111, for example, to ensure that sufficient display space is available for one or more directional features (e.g., arrows 115-118). Other embodiments may detect if cursor 114 is located within a region of interest (e.g, region 310 described above) to ascertain whether certain features should be provided on the display.

When the proper imagery is determined, window 111 may be drawn or redrawn on display 102 as appropriate (step 510). In various embodiments, window 111 is presented superimposed upon primary imagery 110, as described above. Further, various navigational features (e.g., cursor 114, arrows 115-118, icons 302-308, drag bar 402) may be drawn as desired, in accordance with any parameters and rules established in step 508. Window 111 and any associated navigational features may be redrawn in response to inputs subsequently received. In practice, then, after a PIP window 111 and any associated navigation features are presented on display 102 in a first iteration of step 510, subsequently received two-dimensional inputs may be further received and processed (steps 502-508) before re-drawing window 111 according to the newly-received inputs in a subsequent occurrence of step 510. The general logical and data flow of a practical embodiment may be modified from that shown in FIG. 5 in any manner; additional or alternate steps may be provided, and/or one or more steps may be omitted as appropriate.

Accordingly, new systems and techniques for graphically interacting with a PIP window 111 are described. Various embodiments allow for two-dimensional inputs provided from a touchpad or other input device 122 associated with a remote control 112 to interact with arrows, buttons and/or other navigational features to window 111 to be moved, resized or otherwise manipulated as desired by the viewer. Other embodiments may provide additional or alternate features as desired.

As used herein, the word "exemplary" means "serving as an example, instance, or illustration." Any implementation described herein as exemplary is not necessarily to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed is:

1. A method for presenting a picture-in-picture window on a display, the method comprising:
presenting the picture-in-picture window that provides first television programming at a first location within a larger window that simultaneously provides second television programming that is different from the first television programming on the display;
while the picture-in-picture window is visible on the display, simultaneously presenting a graphical navigation feature proximate the picture-in-picture window on the display, wherein the graphical navigation feature has a distance from and a positioning with respect to the picture-in-picture window;
receiving a two-dimensional input that selects the graphical navigation feature; and
in response to the two-dimensional input selecting the graphical navigation feature, moving the picture-in-picture window from the first location to a second location within the larger window of the display as the picture-in-picture window presents the first television programming within the second television programming on the display, wherein, subsequent to said moving, the graphical navigation feature remains present on the display, further wherein the graphical navigation feature retains the distance from and the positioning with respect to the picture-in-picture window subsequent to said moving, and further wherein a portion of the graphical navigation feature is not displayed when the picture-in-picture window is moved so as to be abuttingly adjacent to an edge of the display.

2. The method of claim 1 wherein the graphical navigation feature comprises a plurality of arrows located in proximity to the picture-in-picture window.

3. The method of claim 2 wherein the two-dimensional input corresponds to a cursor interaction with one of the plurality of arrows.

4. The method of claim 2 further comprising displaying the plurality of arrows only when a cursor is in proximity to the picture-in-picture window, and otherwise not displaying the plurality of arrows when the cursor is not in proximity to the picture-in-picture window.

5. The method of claim 2 wherein the picture-in-picture window is presented superimposed upon a primary image on the display.

6. The method of claim 5 further comprising displaying only a subset of the plurality of arrows when the picture-in-picture window is adjacent to an edge of the primary image.

7. The method of claim 1 wherein the navigation feature comprises a drag feature located in proximity to the picture-in-picture window, and wherein the drag feature is selectable to drag the picture-in-picture window from the first position to the second location within the larger window of the display.

8. The method of claim 7 wherein the two-dimensional input corresponds to a cursor interaction with the drag feature.

9. The method of claim 1 wherein the receiving comprises receiving the two-dimensional input from a wireless remote control comprising a two-dimensional input device.

10. The method of claim 9 wherein the two-dimensional input device is one of the group consisting of: a touchpad, a trackball, a joystick, a directional pad, and a plurality of directional keys.

11. A video receiver comprising:
a receiver interface configured to receive an incoming modulated signal;
a decoder configured to decode the incoming modulated signal to obtain primary and secondary video signals;
a wireless receiver configured to receive a two-dimensional input signal; and
a processor configured to generate an output image comprising the video content contained in the primary video signal in a larger window and the video content contained in the secondary video signal in a picture-in-picture window positioned at a first location within the larger window, wherein the picture-in-picture window is displayed simultaneously with a graphical navigation feature, wherein the graphical navigation feature has a distance from and a positioning with respect to the picture-in-picture window, and wherein the processor is further configured to move the position of the picture-in-picture window from the first location to a different second location within the larger window as the picture-in-picture window is presented on the display when the two-dimensional input signal corresponds to the navigation feature, wherein, subsequent to said move, the graphical navigation feature remains present on the display, further wherein the graphical navigation feature retains the distance from and the positioning with respect to the picture-in-picture window subsequent to said move, and further wherein a portion of the graphical navigation feature is not displayed when the picture-in-picture window is moved so as to be abuttingly adjacent to an edge of the display.

12. The video receiver of claim 11 wherein the receiver interface comprises a satellite interface.

13. The video receiver of claim 11 wherein the wireless receiver is configured to receive the two-dimensional input signal from a wireless remote control comprising a two-dimensional input device.

14. The video receiver of claim 13 wherein the two-dimensional input device is one of the group consisting of: a touchpad, a trackball, a joystick, a directional pad, and a plurality of directional keys.

15. The video receiver of claim 11 wherein the graphical navigation feature comprises a plurality of arrows presented in proximity to the picture-in-picture window.

16. The video receiver of claim 15 wherein the two-dimensional input corresponds to a cursor interaction with one of the plurality of arrows.

17. The video receiver of claim 11 wherein the graphical navigation feature comprises a drag feature located in proximity to the picture-in-picture window.

18. The video receiver of claim 17 wherein the two-dimensional input corresponds to a cursor interaction with the drag feature.

19. A system for presenting television content on a display, the system comprising:
   a wireless remote control comprising a two-dimensional input device configured to provide a two-dimensional input signal in response to a user input; and
   a video receiver comprising:
      a receiver interface configured to receive an incoming modulated signal;
      a decoder configured to decode the incoming modulated signal to obtain primary and secondary video signals;
      a wireless receiver configured to receive the two-dimensional input signal from the wireless remote control; and
      a processor configured to generate an output image to be presented on the display, wherein the output image comprises the video content contained in the secondary video signal in a picture-in-picture window superimposed on a larger window that provides the video content contained in the primary video signal, wherein the picture-in-picture window is initially located at a first position within the larger window in proximity to a plurality of simultaneously-displayed graphical directional indicators, and wherein the processor is further configured to relocate the picture-in-picture window from the first position to a second position within the larger window that is different from the first position as the picture-in-picture window is presented on the display when the two-dimensional input signal corresponds to one of the plurality of directional indicators, and
   wherein the plurality of directional indicators comprise:
   1) first, second, third, and fourth arrows positioned adjacently to the left, to the right, above, and below the picture-in-picture window, respectively, wherein when the two-dimensional input signal corresponds to the first arrow the picture is relocated leftward, when the two-dimensional input signal corresponds to the second arrow the picture is relocated rightward, when the two-dimensional input signal corresponds to the third arrow the picture is relocated upward, and when the two-dimensional input signal corresponds to the fourth arrow the picture is relocated downward, and
   2) a drag feature located in proximity to the picture-in-picture window, and wherein the drag feature is selectable to drag the picture-in-picture window from the first position to the second location within the larger window of the display.

20. The system of claim 19, wherein the processor is further configured to display the first, second, third and fourth arrows and the drag feature only when a cursor is in proximity to the picture-in-picture window, and otherwise not display the first, second, third and fourth arrows or the drag feature when the cursor is not in proximity to the picture-in-picture window.

* * * * *